S. EMERY & D. H. EBERLY.
Harrow.

No. 212,204.  Patented Feb. 11, 1879.

WITNESSES
Mary J. Attley
Geo. C. Poulton

INVENTORS
Stephen Emery
D. H. Eberly
by E. W. Anderson,
ATTORNEY

UNITED STATES PATENT OFFICE.

STEPHEN EMERY AND DANIEL H. EBERLY, OF CAMERON, MISSOURI.

IMPROVEMENT IN HARROWS.

Specification forming part of Letters Patent No. 212,204, dated February 11, 1879; application filed May 18, 1878.

*To all whom it may concern:*

Be it known that we, STEPHEN EMERY and DANIEL H. EBERLY, of Cameron, in the county of Clinton and State of Missouri, have invented a new and valuable Improvement in Harrows; and we do hereby declare that the following is a full, clear, and exact description of the construction and operation of the same, reference being had to the annexed drawings, making a part of this specification, and to the letters and figures of reference marked thereon.

Figure 1:
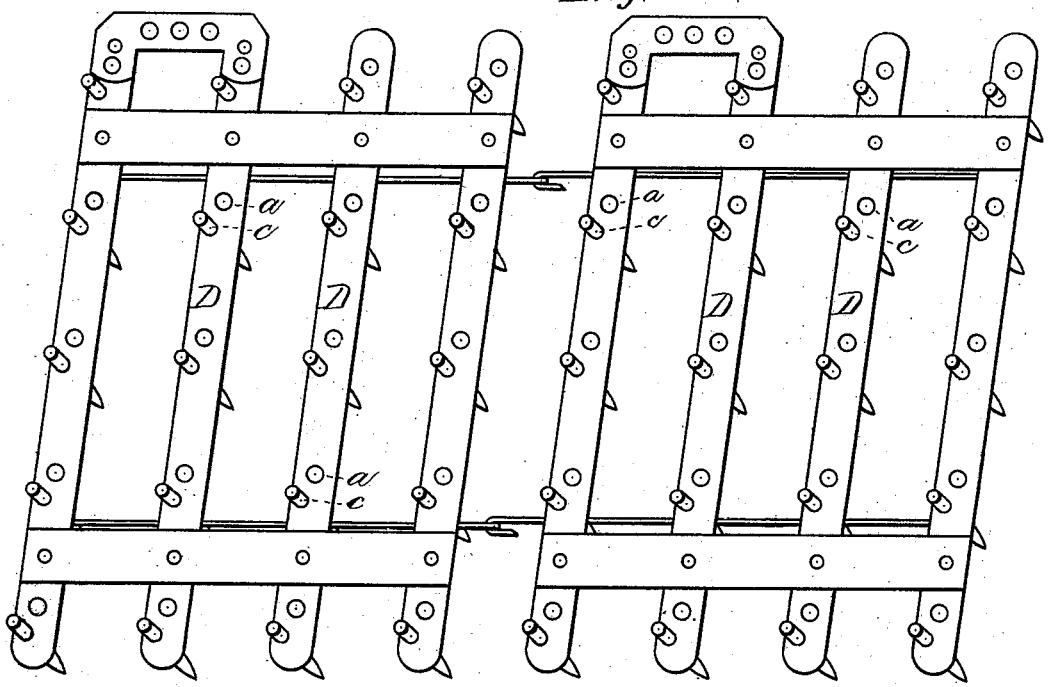
Figure 2:
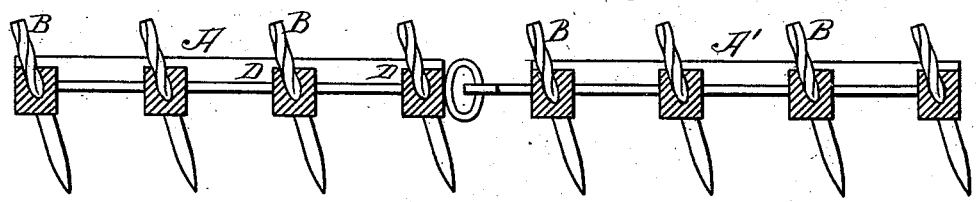
Figure 3:
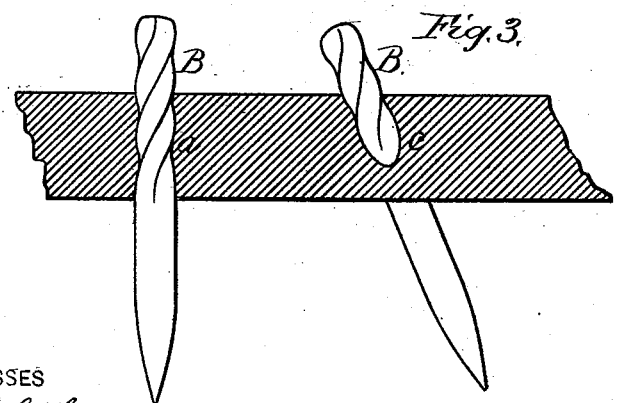

Figure 1 of the drawings is a representation of a top view of a harrow showing our improvements, and Fig. 2 is a transverse section of the same. Fig. 3 is a detail section.

This invention has for its object the improvement of harrows.

The nature of the invention consists in a harrow-frame, having both vertical and inclined perforations, forming tooth-seats, to which the harrow-teeth may be shifted at pleasure, whereby with a single frame and one set of teeth the work of a seeding and smoothing harrow may be done, as will be hereinafter more fully set forth.

In the annexed drawings, the letters A A' designate the sections of double harrow, coupled together in the usual manner, and B are the teeth. The frame of the harrow has vertical tooth-seats $a$ inserted, in which the teeth B will be upright, and also inclined tooth-seats $c$, in which they will be at an angle more or less sharp to the said frame, according to their pitch. These tooth-seats are formed by vertical and inclined perforations through the beams D. The perforations $c$ are bored diagonally to the length of the beam, and rearwardly inclined therein, so that the inclination of the teeth will be in line with the line of draft from the corner of the harrow, and the upper ends or tangs of the teeth are designed to be inserted in these holes or seats. These seats are near each other, preferably, and the teeth may be readily shifted from the vertical to the inclined seats, and the reverse.

When the teeth are upright the harrow is designed to be used for seeding purposes; but when in an inclined position, as a land-smoother.

This is done, as aforesaid, simply by shifting a single set of teeth to different positions in the same frame.

The pitch of the teeth when inclined is slightly to the side and rear.

What I claim as new, and desire to secure by Letters Patent, is—

In a harrow-frame, the beams D, having the vertical perforations $a$, and diagonally and rearwardly inclined perforations $c$, bored in or near the center of the beams for the teeth B, which are removable from one series of perforations to the other, substantially as specified.

In testimony that we claim the above we have hereunto subscribed our names in the presence of two witnesses.

STEPHEN EMERY.
DANIEL H. EBERLY.

Witnesses:
C. N. BURNHAM,
S. H. CORN.